(12) United States Patent
Soeda et al.

(10) Patent No.: US 10,620,072 B2
(45) Date of Patent: Apr. 14, 2020

(54) CAPACITIVE PRESSURE SENSOR

(71) Applicant: AZBIL CORPORATION, Chiyoda-ku (JP)

(72) Inventors: Masaru Soeda, Chiyoda-ku (JP); Takuya Ishihara, Chiyoda-ku (JP); Masashi Sekine, Chiyoda-ku (JP); Hidenobu Tochigi, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 187 days.

(21) Appl. No.: 15/896,226

(22) Filed: Feb. 14, 2018

(65) Prior Publication Data

US 2018/0238757 A1 Aug. 23, 2018

(30) Foreign Application Priority Data

Feb. 17, 2017 (JP) .................................. 2017-027957

(51) Int. Cl.
| | |
|---|---|
| *G01L 9/00* | (2006.01) |
| *G01L 13/02* | (2006.01) |
| *G01L 9/12* | (2006.01) |
| *G01L 19/06* | (2006.01) |
| *G01L 19/00* | (2006.01) |
| *H01G 5/16* | (2006.01) |
| *H01G 5/00* | (2006.01) |

(52) U.S. Cl.
CPC .......... *G01L 9/0072* (2013.01); *G01L 9/0042* (2013.01); *G01L 9/125* (2013.01); *G01L 13/025* (2013.01); *G01L 19/0681* (2013.01); *G01L 19/0084* (2013.01); *H01G 5/16* (2013.01); *H01G 2005/02* (2013.01)

(58) Field of Classification Search
CPC ...... G01L 9/0072; G01L 9/0042; G01L 9/125
See application file for complete search history.

(56) References Cited

U.S. PATENT DOCUMENTS

| | | | |
|---|---|---|---|
| 2014/0150559 | A1 | 6/2014 | Ishihara et al. |
| 2015/0040674 | A1 | 2/2015 | Ishihara et al. |

FOREIGN PATENT DOCUMENTS

| | | |
|---|---|---|
| JP | 9-61270 | 3/1997 |
| JP | 2002-111011 | 4/2002 |
| KR | 10-2014-0070414 A | 6/2014 |
| KR | 10-1539177 B1 | 7/2015 |

OTHER PUBLICATIONS

Office Action dated Feb. 14, 2019 in the corresponding Korean Patent Application No. 10-2018-0015506 submitting English Translation only citing document AO therein 3 pages.
Office Action dated Aug. 7, 2019 in Korean Patent Application No. 10-2018-0015506.

*Primary Examiner* — Jamel E Williams
(74) *Attorney, Agent, or Firm* — Oblon, McClelland, Maier & Neustadt, L.L.P.

(57) ABSTRACT

A base plate has pressure introducing holes at positions facing a diaphragm support portion. A thickness portion (thick portion) of the diaphragm support portion and a sensor base joined to the diaphragm support portion thus serves as a heat dissipating or absorbing portion and hinders the transfer of thermal energy of a measured medium to a sensor diaphragm.

6 Claims, 7 Drawing Sheets

CAPACITIVE PRESSURE SENSOR

CROSS-REFERENCE TO RELATED APPLICATIONS

The present application is based on and claims priority to Japanese Application No. 2017-027957, filed Feb. 17, 2017, the entire contents of which are incorporated therein by reference.

BACKGROUND

1. Field of the disclosure

The present disclosure relates to a capacitive pressure sensor including a sensor chip having a diaphragm structure that detects a capacitance corresponding to pressure of a medium to be measured.

2. Description of the Related Art

In pressure sensors, including vacuum gauges which are used for example in semiconductor manufacturing facilities, a sensor element including a small diaphragm has been often adopted using a so-called micro-electromechanical systems (MEMS) technique. A main detection principle of this sensor element is that the pressure of a pressure medium is received by the diaphragm and the resulting displacement of the diaphragm is converted into some type of signal.

For example, as a pressure sensor that uses a sensor element of this type, a capacitive pressure sensor is widely known. The capacitive pressure sensor is configured to detect, as a change in capacitance, the displacement of a diaphragm that flexes in response to pressure of a medium to be measured (hereinafter referred to as "measured medium"). The capacitive pressure sensor is less dependent on the type of gas, and thus is often used in semiconductor facilities and various industrial applications. For example, this capacitive pressure sensor is used to measure a vacuum in a manufacturing process in a semiconductor manufacturing apparatus. The capacitive pressure sensor for measuring a vacuum is called a diaphragm gauge. The diaphragm that flexes in response to pressure of the measured medium is called a pressure-sensitive diaphragm or sensor diaphragm.

The diaphragm gauge is required to be resistant not only to corrosion by material gases and cleaning gases, but also to accumulation of byproducts produced during the process (hereinafter, these substances are referred to as "contaminants"). During normal operation in facilities, the accumulation occurs not only inside the process chambers, but also inside the pipes, pumps, and diaphragm gauge, and causes errors in vacuum measurement. To reduce unexpected accumulation of contaminants, vacuum components such as chambers, including the diaphragm gauge, are normally self-heated at a temperature of up to about 200° C. This means that the diaphragm gauge is required to be resistant to this self-heating temperature, as well as to the corrosion described above.

During the process or maintenance of the semiconductor manufacturing apparatus, a measured medium (e.g., gas) having a pressure within, or even beyond, the measurement range is repeatedly applied to the sensor element inside the diaphragm gauge in a self-heating state. Therefore, if there is residual stress produced during sensor manufacture, an error, such as hysteresis, appears in the output signal and this affects sensor accuracy.

As described above, it is essential for the diaphragm gauge to apply pressure to the diaphragm for the purpose of measurement. Pressure as high as atmospheric pressure, or the full-scale pressure of the sensor, is expected to be repeatedly applied to the diaphragm. Then, the sensor is normally evacuated again and returns to the zero point.

Hysteresis associated with a significant increase or decrease in applied pressure (i.e., hysteresis originating from pressure caused by changes in the state of mechanical stress) has been thought to occur at a joint portion of a sensor member. When pressure is applied, a metal housing of a package or the sensor member deforms, and its impact is transmitted to a diaphragm. This changes the shape of the diaphragm, and may cause hysteresis or shifts.

In many cases, this problem is created by a contact portion, such as a welded portion, which is susceptible to state changes resulting from deformation caused by pressure. Also, a joint portion where different types of materials are joined together may be irreversibly changed by a small mechanical impact, due to significant strain at the interface of the joint portion. An electrode material forming a capacitance may deform in response to pressure applied thereto. Preventing the occurrence of shifts or hysteresis in the region of pressure which can be applied to the sensor has been a great challenge in designing pressure sensors. Various measures have been taken to solve this challenge (see, e.g., Japanese Unexamined Patent Application Publication No. 9-61270).

In the diaphragm gauge, however, heat transfer from the measured medium to the diaphragm upon receiving pressure is essentially inevitable in measurement principle, and this poses challenges other than that described above. In particular, when there are local temperature changes in part of the sensor element (especially in a diaphragm region), such temperature changes directly lead to hysteresis errors in sensor output. To maintain the accuracy of the sensor product, it is important to minimize the impact of such temperature changes.

However, even when an attempt is made to control the self-heating temperature to achieve uniform temperature, such an attempt has no significant effect on the local temperature distribution inside the sensor in a vacuum state. This is probably due to the significant impact of heat transfer by gas molecules. As a measurement pressure range decreases, the level of hysteresis appearing in the output becomes more severe as a result of an increasing impact of errors on the full-scale pressure. Since this greatly affects the measurement accuracy of the sensor, an improvement needs to be made.

As described above, most measures that have been taken so far are related to dealing with residual stress produced during manufacture of the sensor structure. Currently, no sufficient measures are taken to deal with the factor (heat transfer from the measured medium to the diaphragm) which becomes apparent in a micropressure range and is inevitable in measurement principle.

Figure 9:
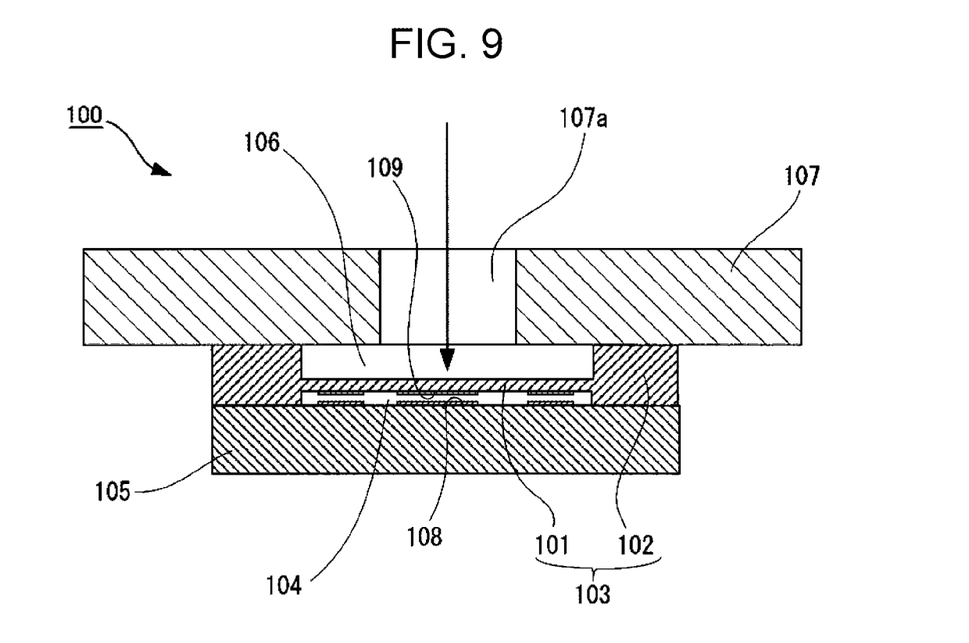
FIG. 9 illustrates a configuration of a main part of a diaphragm gauge according to the related art.

This challenge will be specifically described with reference to FIG. 9. FIG. 9 illustrates a configuration of a main part of a diaphragm gauge according to the related art. A diaphragm gauge 100 includes a diaphragm unit 103 including a diaphragm (sensor diaphragm) 101 displaced in response to pressure of a measured medium and a diaphragm support portion 102 configured to support the periphery of the sensor diaphragm 101, a sensor base 105 joined to one side of the diaphragm support portion 102 and configured to define a reference vacuum chamber 104 together with the sensor diaphragm 101, and a base plate 107 joined to the other side of the diaphragm support portion 102 opposite the sensor base 105 and configured to define a pressure introducing chamber 106 together with the sensor diaphragm 101.

In the diaphragm gauge 100, a fixed electrode 108 is formed on a surface of the sensor base 105 adjacent to the reference vacuum chamber 104, and a movable electrode 109 is formed on a surface of the sensor diaphragm 101 adjacent to the reference vacuum chamber 104 in such a manner as to face the fixed electrode 108. The base plate 107 has a pressure introducing hole 107a in the center thereof (corresponding to the center of the sensor diaphragm 101). In the diaphragm gauge 100, the measured medium is introduced through the pressure introducing hole 107a into the pressure introducing chamber 106 and causes the sensor diaphragm 101 to flex.

Figure 10:
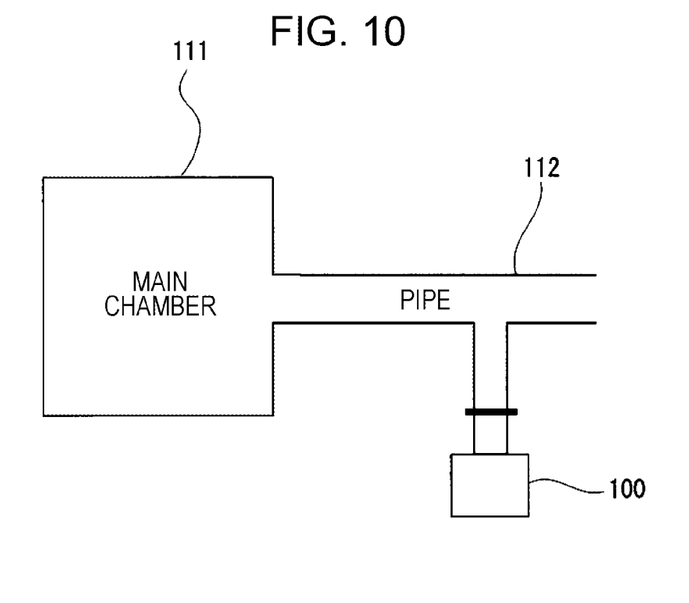
FIG. 10 schematically illustrates how the diaphragm gauge is installed in a semiconductor manufacturing process.

When the diaphragm gauge 100 is used to measure a vacuum in a semiconductor manufacturing process, normally, the chamber is evacuated and the diaphragm gauge 100 maintains the zero point, except during processes under a predetermined set pressure or during maintenance which involves exposure to atmosphere. FIG. 10 schematically illustrates how the diaphragm gauge 100 is installed in a semiconductor manufacturing process. In FIG. 10, reference numeral 111 denotes a main chamber and reference numeral 112 denotes a pipe. At the beginning of measurement, a residual gas of the measured medium, produced during the previous measurement, is in the main chamber 111 and the pipe 112. Even in an evacuated state after application of full-scale pressure, the residual gas of the measured medium flows from the main chamber 111 through the pipe 112 while repeatedly colliding and exchanging thermal energy with the wall of the pipe 112, and eventually reaches the sensor diaphragm 101 in the diaphragm gauge 100.

At this point, if, before application of pressure, there is a difference between the temperature in the main chamber 111, the pipe 112, and the inner surface of the package of the diaphragm gauge 100 and the temperature in the vicinity of the sensor diaphragm 101, the temperature at the location where the gas initially reaches the sensor diaphragm 101 locally rises and falls by exchange of thermal energy. If the pressure range of an object to be measured is high, heat diffuses because the sensor diaphragm 101 is relatively thick, and local expansion does not occur or has a very limited impact.

Figure 11:
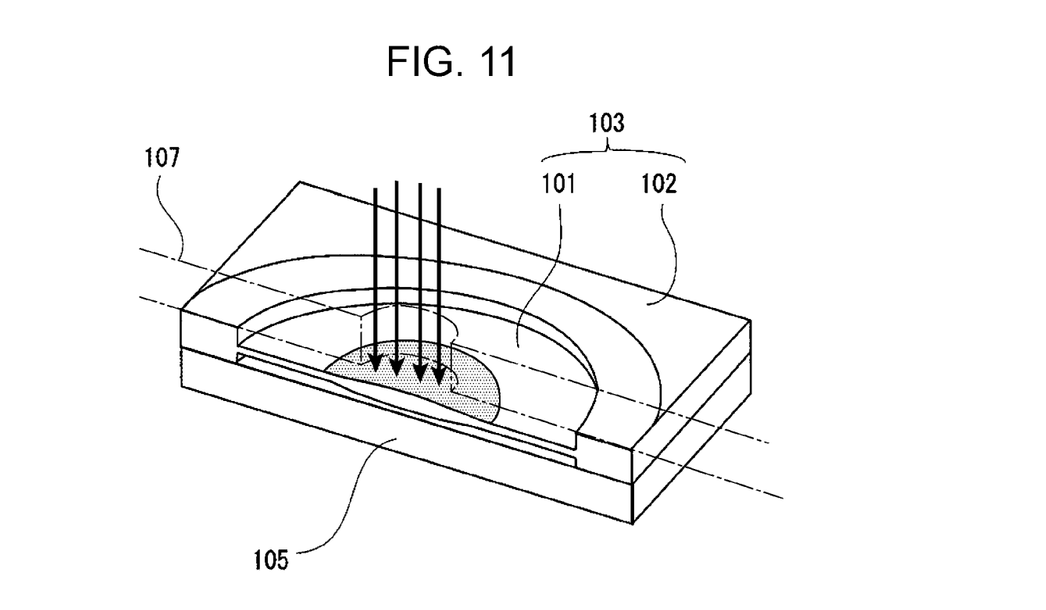
FIG. 11 illustrates deformation of a diaphragm caused by heat transfer from a measured medium.

However, in a micropressure range, the sensor diaphragm 101 is made thin to achieve higher sensitivity to pressure. Thus, heat does not diffuse, and a phenomenon of local expansion or contraction occurs. That is, as illustrated in FIG. 11, heat collects in the center of the sensor diaphragm 101, a microscale temperature distribution is produced, and a phenomenon of local expansion or contraction occurs.

If such local expansion or contraction occurs, the shape or the original and initial flexure of the sensor diaphragm 101, or the method of securing the sensor diaphragm 101, probably causes flexure which is independent of pressure, and generates shifts in sensor output. When a gas with a temperature different from that of the sensor diaphragm 101 is continuously supplied from the pipe 112 and the degree of vacuum in the background is, for example, about $10^{-4}$ Pa (0.001% FS of a 13-Pa range sensor), it takes a long time to uniformly distribute heat over the pipe 112 and the inner wall of the sensor through exchange of thermal heat by residual gas molecules. This means that a long and gradual shift is observed until the original state is restored. If the original state is not completely restored, the shift appears as an offset in the output.

The present inventors applied a constant heat flux to an area with a diameter of 2 mm in the center of a diaphragm having an initial flexure of 0.1 μm and a diameter of 7.5 mm, and calculated the level of temperature rise and flexure. When the thickness of the diaphragm was doubled (e.g., from 25 μm to 50 μm), the temperature rise was substantially halved and the flexure caused by the application of heat flux was reduced to a little more than one-eighth of the original. The present inventors thus found out that the phenomenon described above was less likely to occur in a thicker diaphragm.

SUMMARY DISCLOSURE

The present disclosure has been made to solve the problems described above. An object of the present disclosure is to provide a capacitive pressure sensor that can reduce deformation of the diaphragm caused by heat transfer from the measured medium, and can reduce output signal errors, such as hysteresis and shifts.

To achieve the object described above, the present disclosure provides a capacitive pressure sensor that includes a diaphragm unit (33) including a diaphragm (31) displaced in response to pressure of a measured medium and a diaphragm support portion (32) configured to support a periphery of the diaphragm, a sensor base (35) joined to one side of the diaphragm support portion and configured to define a reference vacuum chamber (34) together with the diaphragm, a base plate (22) joined to the other side of the diaphragm support portion opposite the sensor base and configured to define a pressure introducing chamber (36) together with the diaphragm, a fixed electrode (37) formed on a surface of the sensor base adjacent to the reference vacuum chamber, and a movable electrode (38) formed on a surface of the diaphragm adjacent to the reference vacuum chamber in such a manner as to face the fixed electrode. The base plate has, at a position facing the diaphragm support portion, a pressure introducing hole (22a) for introducing the measured medium into the pressure introducing chamber.

In the present disclosure, the base plate has a pressure introducing hole at a position facing the diaphragm support portion, and the measured medium is introduced through the pressure introducing hole into the pressure introducing chamber. That is, in the present disclosure, the measured medium passes through the diaphragm support portion and is guided to the surface of the diaphragm. A thickness portion (thick portion) of the diaphragm support portion and the sensor base joined to the diaphragm support portion thus serves as a heat dissipating or absorbing portion and hinders the transfer of thermal energy of the measured medium to the diaphragm.

In the foregoing explanation, components shown in the drawings and corresponding to those of the invention are indicated, as examples, by reference numerals in parentheses.

As described above, in the present disclosure, the base plate has a pressure introducing hole at a position facing the diaphragm support portion. The thickness portion (thick portion) of the diaphragm support portion and the sensor base joined to the diaphragm support portion thus serves as a heat dissipating or absorbing portion and hinders the transfer of thermal energy of the measured medium to the diaphragm. This reduces deformation of the diaphragm caused by heat transfer from the measured medium, and reduces output signal errors, such as hysteresis and shifts.

DETAILED DESCRIPTION OF THE PREFERRED EMBODIMENTS

Figure 1:
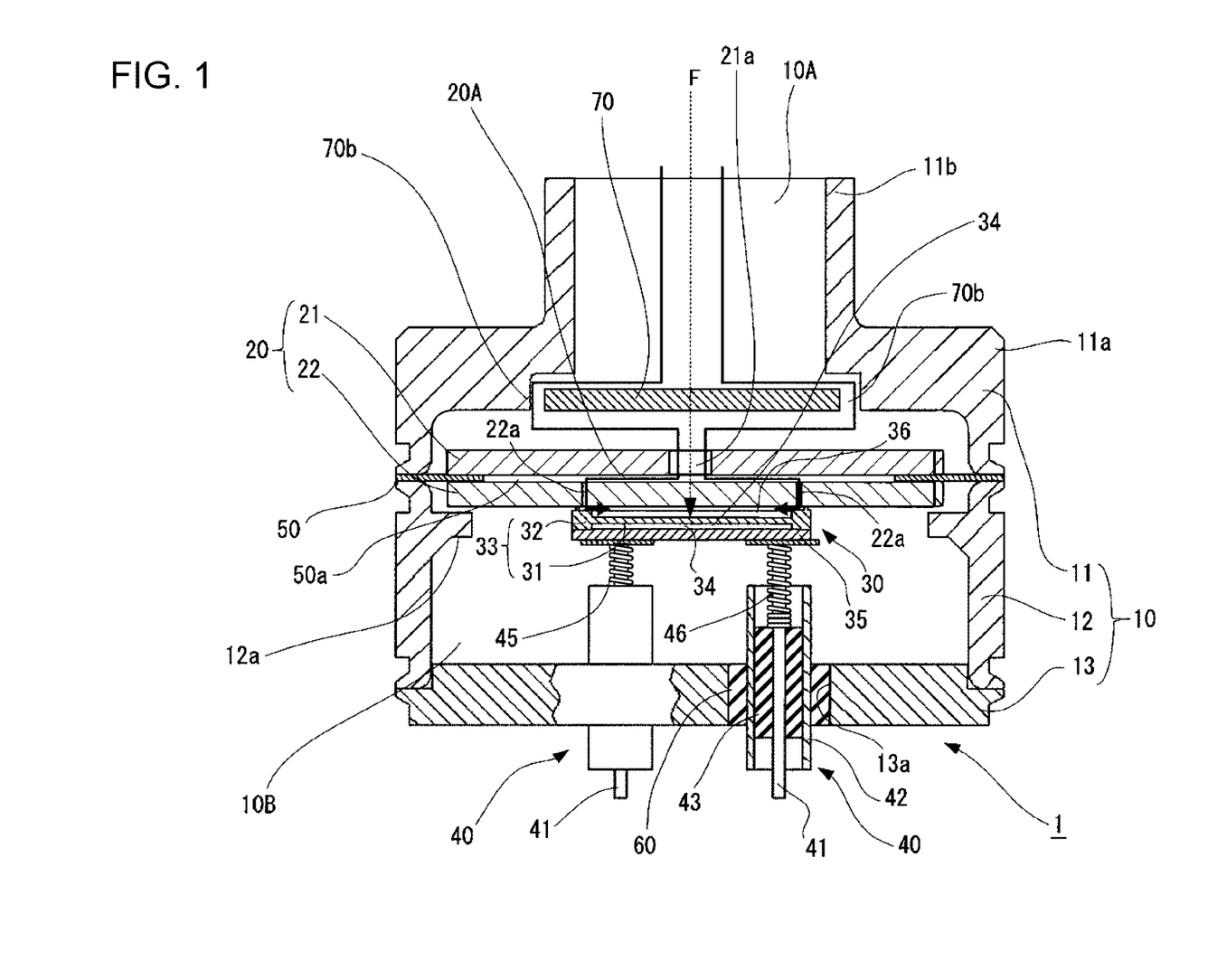
FIG. 1 is a vertical cross-sectional view of a main part of a diaphragm gauge which is an embodiment of a capacitive pressure sensor according to the present disclosure.

Hereinafter, the present disclosure will be described in detail on the basis of the drawings. FIG. 1 is a vertical cross-sectional view of a main part of a diaphragm gauge which is an embodiment of a capacitive pressure sensor according to the present disclosure.

A diaphragm gauge 1 includes a package 10, a base plate assembly 20 contained in the package 10, a sensor chip 30 also contained in the package 10 and joined to the base plate assembly 20, and electrode lead portions 40 directly attached to the package 10 and configured to electrically connect the interior and exterior of the package 10. The base plate assembly 20 is composed of a first base plate 21 and a second base plate 22, spaced from the package 10, and supported by the package 10 with only a supporting diaphragm 50 therebetween.

The package 10 includes an upper housing 11, a lower housing 12, and a cover 13. The upper housing 11, the lower housing 12, and the cover 13 are made of metal resistant to corrosion and are joined to one another by welding.

The upper housing 11 is formed by connecting cylindrical bodies of different diameters. A large-diameter portion 11a of the upper housing 11 has a portion joined to the supporting diaphragm 50, and a small-diameter portion 11b of the upper housing 11 defines an introducing portion 10A into which a measured medium flows.

The lower housing 12 has a substantially cylindrical shape. An independent vacuum chamber 10B in the package 10 is formed by the lower housing 12, the cover 13, the supporting diaphragm 50, the base plate assembly 20, and the sensor chip 30. The vacuum chamber 10B contains a gas-absorbing material called getter (not shown) to maintain the degree of vacuum therein.

The lower housing 12 has stoppers 12a protruding on a side thereof adjacent to the supporting diaphragm 50 and arranged at appropriate locations in the circumferential direction. The stoppers 12a are configured to limit excessive displacement of the base plate assembly 20 caused by an abrupt increase in the pressure of the measured medium.

The cover 13 is a circular plate having electrode lead insertion holes 13a formed at predetermined locations therein. The electrode lead portions 40 are each embedded in the cover 13 at a corresponding one of the electrode lead insertion holes 13a, with a hermetic seal 60 between the cover 13 and the electrode lead portion 40. This ensures sealing between them.

The supporting diaphragm 50 is a thin metal sheet having an outer shape that conforms to the shape of the package 10. While being positioned between the first base plate 21 and the second base plate 22, the outer edge portion of the supporting diaphragm 50 is sandwiched between, and joined by welding or the like to, edge portions of the upper housing 11 and the lower housing 12.

The supporting diaphragm 50 is, for example, several tens of micrometers thick in the present embodiment and substantially thinner than the base plates 21 and 22. The supporting diaphragm 50 has, in the center thereof, a large-diameter hole 50a that forms a slit-like space (cavity) 20A between the first base plate 21 and the second base plate 22.

The base plates 21 and 22 are made of sapphire, which is a single-crystal body of aluminum oxide. The first base plate 21 is joined to the upper surface of the supporting diaphragm 50 while being spaced from the inner surface of the package 10, and the second base plate 22 is joined to the lower surface of the supporting diaphragm 50 while being spaced from the inner surface of the package 10.

The first base plate 21 has, in the center thereof, an introducing hole 21a for introducing the measured medium. The introducing hole 21a communicates with the slit-like space (cavity) 20A. The second base plate 22 has a plurality of (four, in this example) discharging holes 22a for discharging the measured medium. The discharging holes 22a communicate with the slit-like space (cavity) 20A and the pressure introducing chamber 36 in the sensor chip 30.

Figure 2:
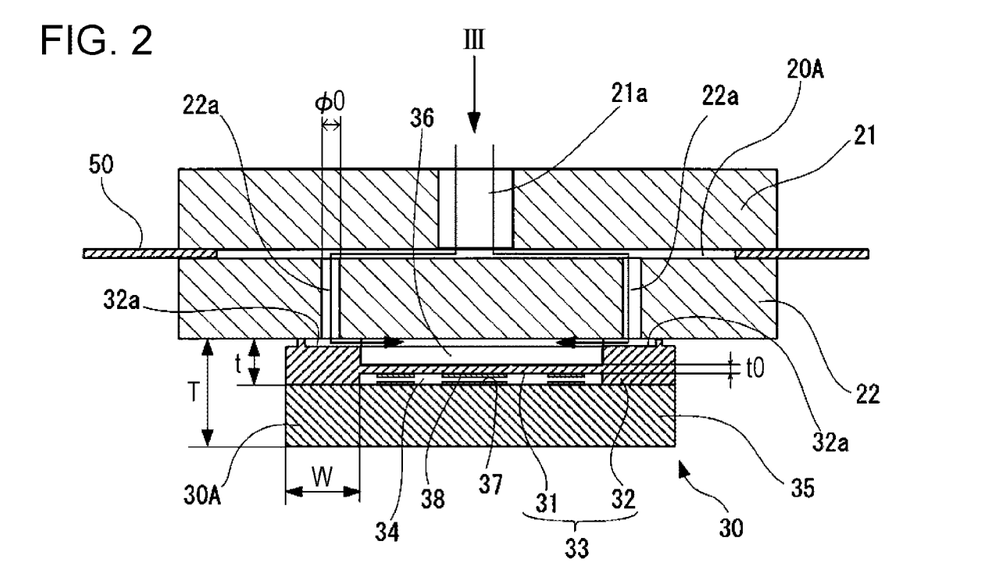
FIG. 2 illustrates a main part of the diaphragm gauge illustrated in FIG. 1.
Figure 3:
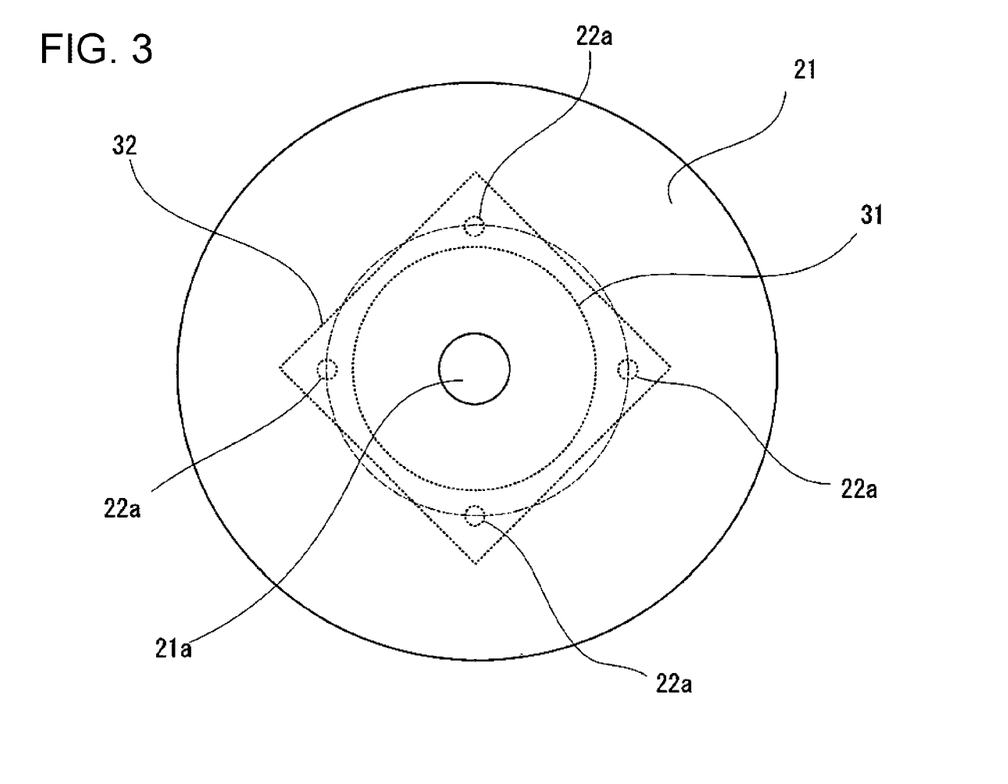
FIG. 3 is a plan view as viewed in the direction of arrow III in FIG. 2.

FIGS. 2 and 3 illustrate a positional relationship between the introducing hole 21a formed in the first base plate 21 and the discharging holes 22a formed in the second base plate 22. FIG. 2 is a vertical cross-sectional view of a main part of the diaphragm gauge 1 illustrated in FIG. 1, and FIG. 3 is a plan view as viewed in the direction of arrow III in FIG. 2.

As illustrated in FIGS. 2 and 3, the introducing hole 21a in the first base plate 21 and the discharging holes 22a in the second base plate 22 are arranged so as not to overlap in the direction of thickness of the base plates 21 and 22. In this example, the first base plate 21 has, in the center thereof, one introducing hole 21a for introducing the measured medium, and the second base plate 22 has, at locations away from the center thereof, four discharging holes 22a for discharging the measured medium. The discharging holes 22a correspond to a pressure introducing hole (pressure introducing holes) formed in a base plate according to the present disclosure. The discharging holes (pressure introducing holes) 22a formed in the second base plate 22 will be described in detail later on. In this example, the first base plate 21 has only one introducing hole 21a in the center thereof for introducing the measured medium. However, the number and position of the introducing hole 21a is not limited to this.

As described above, the base plates 21 and 22 are substantially greater in thickness than the supporting diaphragm 50. At the same time, the base plates 21 and 22 have a so-called sandwich structure in which the supporting diaphragm 50 is sandwiched between the base plates 21 and 22.

This prevents warpage of this portion caused by thermal stress resulting from a difference in thermal expansion coefficient between the supporting diaphragm 50 and the base plate assembly 20.

The sensor chip 30 is made of sapphire, which is a single-crystal body of aluminum oxide, and is rectangular in shape as viewed from above. The sensor chip 30 is joined to the lower surface of the second base plate 22 with an aluminum-oxide-based bonding material interposed therebetween. The technique for joining the sensor chip 30 is not described here, as it is described in detailed in Japanese Unexamined Patent Application Publication No. 2002-111011.

The sensor chip 30 measures 1 cm or less per side as viewed from above. The sensor chip 30 includes a diaphragm unit 33 including a diaphragm (sensor diaphragm) 31 displaced in response to pressure of the measured medium and a diaphragm support portion 32 configured to support the periphery of the sensor diaphragm 31, and a sensor base 35 joined to the diaphragm support portion 32 and configured to define a reference vacuum chamber 34 together with the sensor diaphragm 31.

In the sensor chip 30, the diaphragm support portion 32 opposite the sensor base 35 is joined to the second base plate 22. This forms the pressure introducing chamber 36 between the second base plate 22 and the sensor diaphragm 31. The reference vacuum chamber 34 in the sensor chip 30 and the vacuum chamber 10B in the package 10 maintain the same degree of vacuum therein through a communication hole (not shown) at an appropriate location in the sensor base 35.

The diaphragm unit 33 and the sensor base 35 are joined together by so-called direct bonding to form the integral sensor chip 30. Although the diaphragm unit 33 is formed by the sensor diaphragm 31 and the diaphragm support portion 32 configured as an integral component in the present embodiment, the sensor diaphragm 31 and the diaphragm support portion 32 may be configured as separate components. For example, the diaphragm support portion 32 may be divided into upper and lower parts, between which the sensor diaphragm 31 is sandwiched. In this case, a portion sandwiched between the upper and lower parts of the diaphragm support portion 32 serves as a component of the diaphragm support portion 32.

In the sensor chip 30, a fixed electrode 37 made of a conductor, such as gold or platinum, is formed on a surface of the sensor base 35 adjacent to the reference vacuum chamber 34, and a movable electrode 38 made of a conductor, such as gold or platinum, is formed on a surface of the sensor diaphragm 31 adjacent to the reference vacuum chamber 34 in such a manner as to face the fixed electrode 37.

Figure 4:
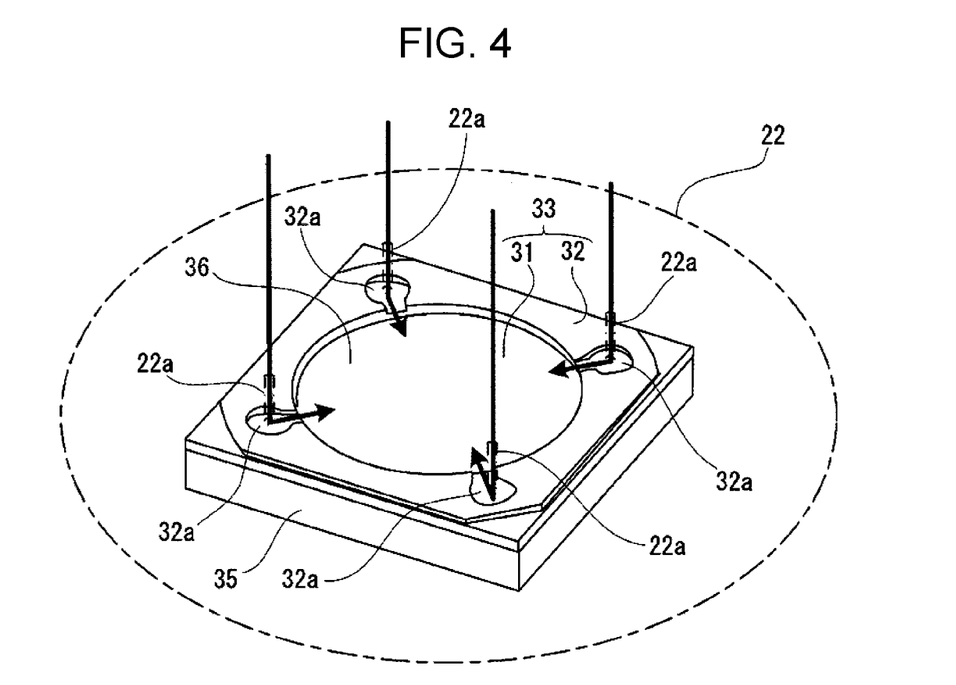
FIG. 4 is a perspective view illustrating locations of pressure introducing holes formed in a base plate and passages of a measured medium formed in a diaphragm support portion.

The second base plate 22 has the four discharging holes 22a which serve as pressure introducing holes for introducing the measured medium into the pressure introducing chamber 36. Hereinafter, the discharging holes 22a formed in the second base plate 22 may also be referred to as "pressure introducing holes 22a". The four pressure introducing holes 22a are formed at positions facing the diaphragm support portion 32 in such a manner that they are radially equidistant from the center of the second base plate 22 and circumferentially evenly spaced apart from one another. As illustrated in FIG. 4, the diaphragm support portion 32 has passages 32a directly below the respective pressure introducing holes 22a in the second base plate 22. The passages 32a are configured to allow the pressure introducing holes 22a to communicate with the pressure introducing chamber 36. The passages 32a are shallow in depth.

The electrode lead portions 40 each include an electrode lead pin 41 and a metal shield 42. The electrode lead pin 41 is embedded at a center portion thereof in the metal shield 42 with a hermetic seal 43 made of an insulating material, such as glass. The electrode lead portion 40 thus maintains an airtight state between both end portions of the electrode lead pin 41.

The electrode lead pin 41 is exposed at one end thereof to the outside of the package 10, so as to transmit the output of the diaphragm gauge 1 to an external signal processing unit through a wire (not shown). The hermetic seal 60 is also interposed between each shield 42 and the cover 13. Contact springs 45 and 46 having conductivity are connected to the respective other ends of the electrode lead pins 41.

The contact springs 45 and 46 are flexible enough so that even if the supporting diaphragm 50 is slightly displaced by an abrupt pressure rise caused by sudden inflow of the measured medium from the introducing portion 10A, the biasing force of the contact springs 45 and 46 does not affect the measurement accuracy of the sensor chip 30.

Figure 5:
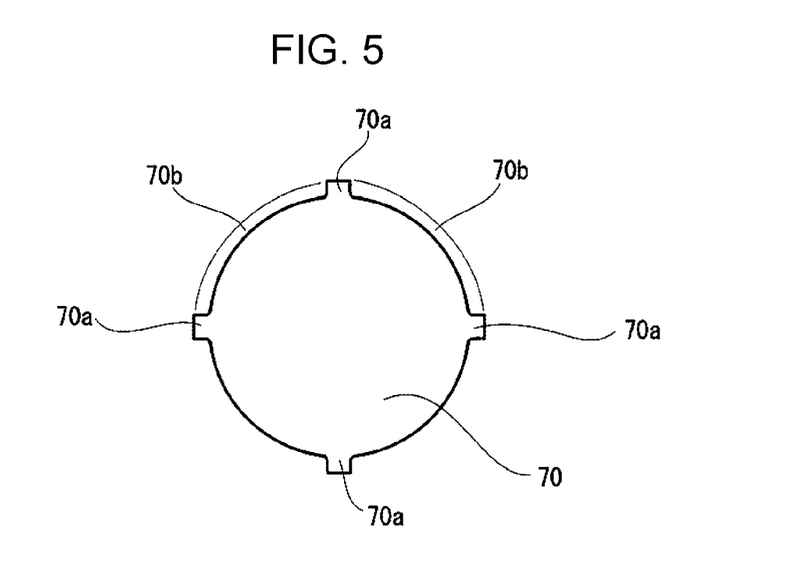
FIG. 5 is a plan view of a baffle disposed at an inlet for the measured medium.

In the diaphragm gauge 1, a baffle 70 made of metal is disposed between the sensor diaphragm 31 of the sensor chip 30 and the introducing portion 10A. Specifically, the baffle 70 is positioned at the inlet for the measured medium from the introducing portion 10A, with a surface thereof being orthogonal to a direction of travel F of the measured medium. FIG. 5 is a plan view of the baffle 70. As illustrated, the baffle 70 has tabs 70a arranged along the outer periphery thereof at predetermined angular intervals. The measured medium passes through gaps 70b between adjacent ones of the tabs 70a and is sent to the sensor diaphragm 31. The illustrated baffle 70 is merely an example and the shape and size of the baffle 70 are not limited to those illustrated.

An operation of the diaphragm gauge 1 will now be described. Note that in the present embodiment, the diaphragm gauge 1 is installed at an appropriate location in a chemical vapor deposition (CVD) process in a semiconductor manufacturing apparatus.

(Pressure Measurement of Measured Medium)

In the diaphragm gauge 1, the measured medium (gas) from the introducing portion 10A reaches the sensor diaphragm 31. Then, a difference between the pressure of the measured medium and the pressure in the reference vacuum chamber 34 causes the sensor diaphragm 31 to flex, changes the distance between the movable electrode 38 and the fixed electrode 37 which are disposed between the back surface of the sensor diaphragm 31 and the inner surface of the sensor base 35, and changes the capacitance value (capacitance) of a capacitor formed by the movable electrode 38 and the fixed electrode 37. The pressure of the measured medium is measured by taking the changes in capacitance out of the diaphragm gauge 1.

(Prevention of Contaminant Accumulation)

In the pressure measurement, the measured medium (gas) from the introducing portion 10A hits the center of the surface of the baffle 70, changes its direction to pass through the gaps 70b around the baffle 70, and flows through the introducing hole 21a of the first base plate 21 into the slit-like space (cavity) 20A between the first base plate 21 and the second base plate 22.

As described above, the introducing hole 21a in the first base plate 21 and the discharging holes 22a in the second base plate 22 are arranged so as not to overlap in the direction of thickness of the base plates 21 and 22. Therefore, the measured medium flowing in the slit-like space (cavity) 20A can travel only in the horizontal direction.

During the horizontal travel of the measured medium in the slit-like space (cavity) 20A, contaminants which are mixed in, in a gaseous state, with the measured medium may accumulate on the inner surface of the base plate 21 or 22. This reduces the amount of contaminants that pass through the pressure introducing holes 22a in the second base plate 22 and eventually reach the sensor diaphragm 31 of the sensor chip 30 in a gaseous state, and thus reduces the amount of contaminants accumulating on the sensor diaphragm (Reduction of Diaphragm Deformation Caused by Heat Transfer from Measured Medium)

In the present embodiment, the four pressure introducing holes 22a are formed at positions facing the diaphragm support portion 32 in such a manner that they are radially equidistant from the center of the second base plate 22 and circumferentially evenly spaced apart from one another. The measured medium is introduced through the pressure introducing holes 22a into the pressure introducing chamber 36.

In the present embodiment, the measured medium passes through the diaphragm support portion 32 and is guided to the surface of the sensor diaphragm 31. Thus, a thickness portion (thick portion) 30A of the diaphragm support portion 32 and the sensor base 35 joined to the diaphragm support portion 32 serves as a heat dissipating or absorbing portion and hinders the transfer of thermal energy of the measured medium to the sensor diaphragm 31. That is, the thick portion 30A defined by T×W in FIG. 2 allows thermal energy of the measured medium to escape to the outside, and hinders the transfer of thermal energy to the sensor diaphragm 31. This reduces deformation of the sensor diaphragm 31 caused by heat transfer from the measured medium, and reduces output signal errors, such as hysteresis and shifts.

In the present embodiment, when t0 represents the thickness of the sensor diaphragm 31, a thickness T of the thick portion 30A (i.e., the sum of the thicknesses of the diaphragm support portion 32 and the sensor base 35) can be expressed as $T=30 \cdot t0$ and a thickness t of the diaphragm support portion 32 can be expressed as $t=5 \cdot t0$. Also, a width W of the thick portion 30A (i.e., the width of the diaphragm support portion 32) can be expressed as $W>3 \cdot \emptyset 0$, where $\emptyset 0$ is the diameter of the pressure introducing holes 22a in the second base plate 22.

Figure 6:
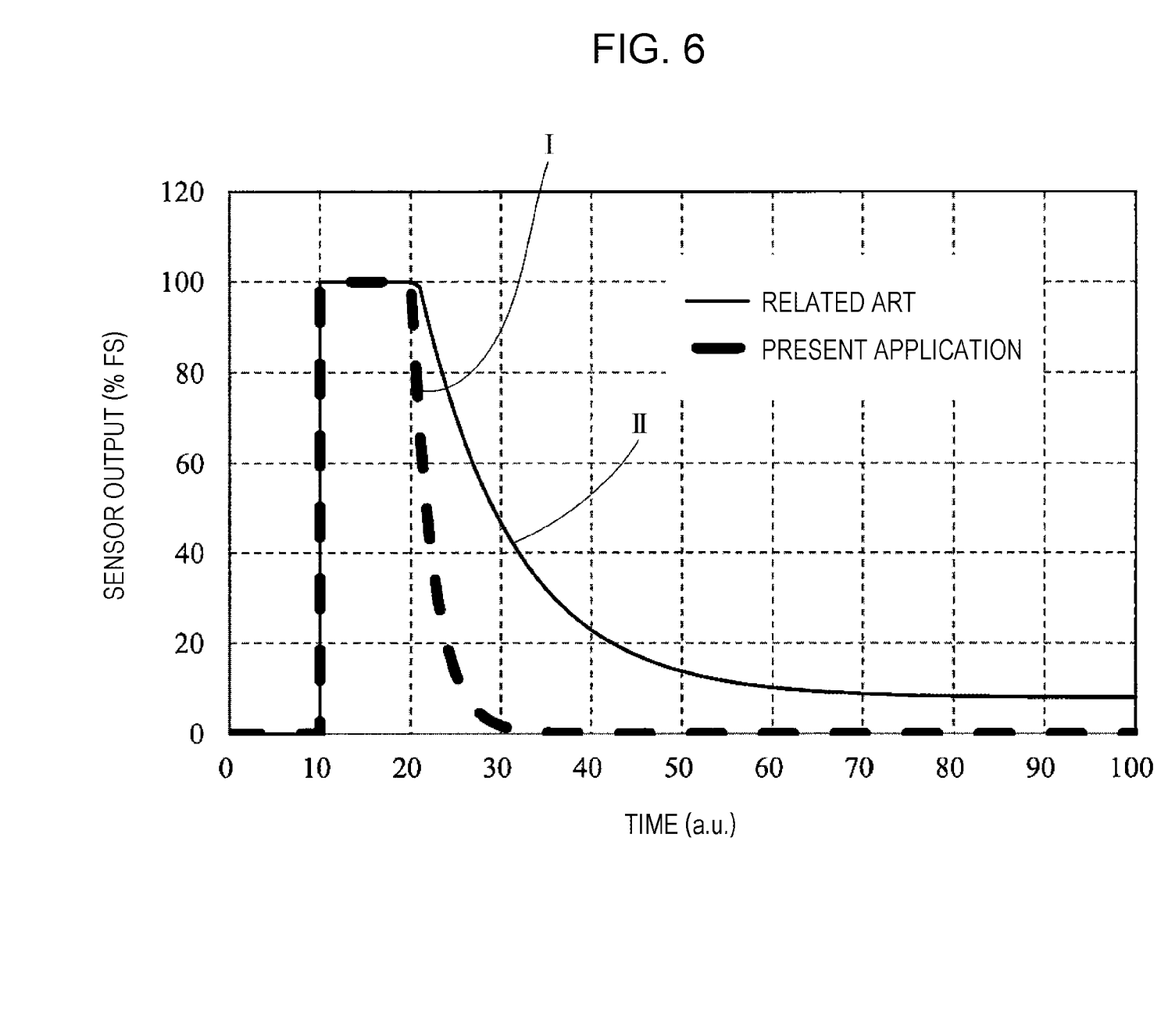
FIG. 6 is a graph showing a result of measurement made by a diaphragm gauge adopting a structure of the present embodiment.

FIG. 6 is a graph showing a result of measurement made by a diaphragm gauge adopting the structure of the present embodiment. Application of full-scale pressure at the beginning of measurement is followed by evacuation. FIG. 6 shows how the diaphragm gauge according to the present embodiment returns to the original state, as compared to that of the related art. In FIG. 6, a characteristic I indicated by a dotted line represents a change in the sensor output of the diaphragm gauge adopting the structure of the present embodiment, and a characteristic II indicated by a solid line represents a change in the sensor output of the diaphragm gauge adopting the structure of the related art.

Figure 7:
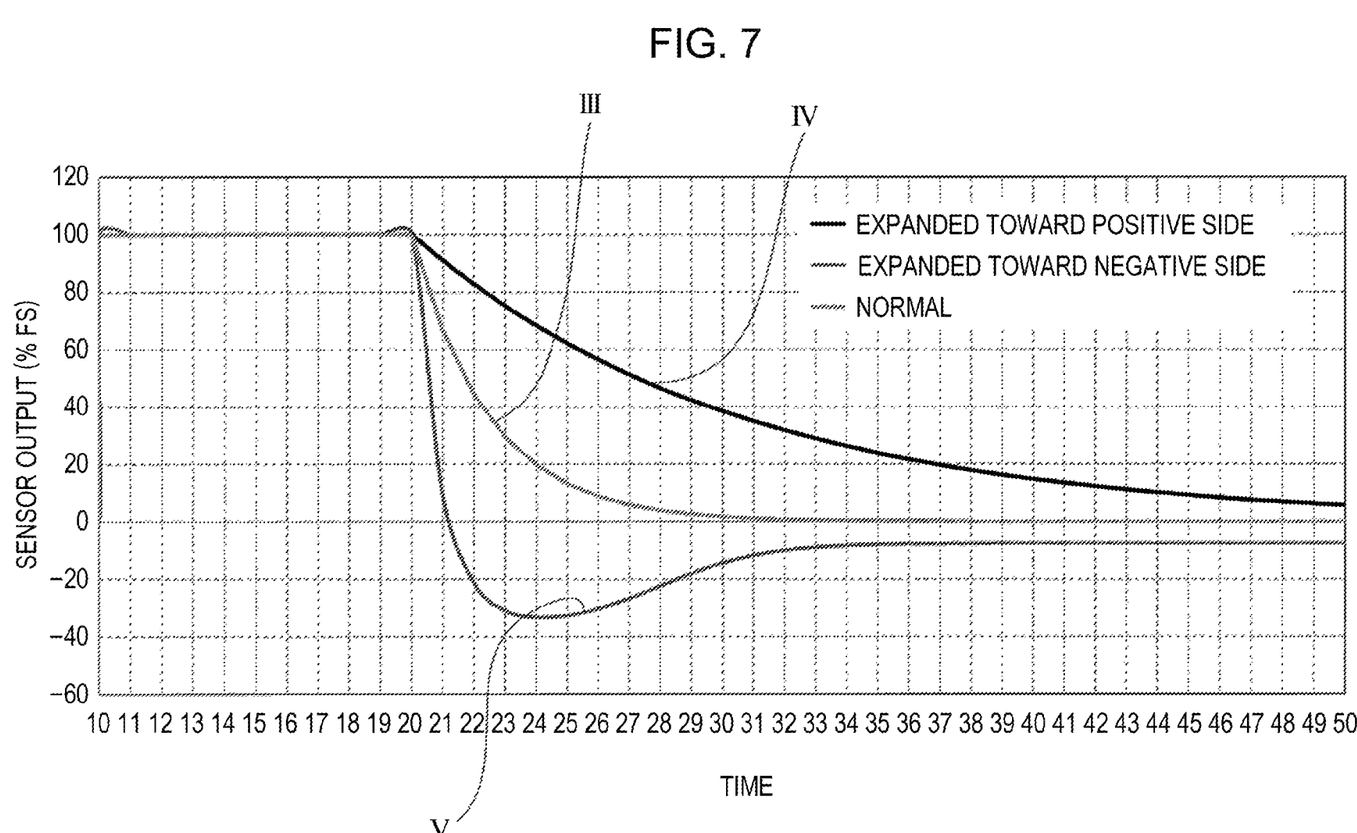
FIG. 7 is a graph showing how the sensor output changes in the normal state, in the case of expansion toward the positive side, and in the case of expansion toward the negative side.

This result shows that the signal-following capability of the diaphragm gauge adopting the structure of the present embodiment is higher than that of the diaphragm gauge adopting the structure of the related art. That is, the diaphragm gauge adopting the structure of the present embodiment more quickly returns to the zero point than the diaphragm gauge adopting the structure of the related art. Thus, since the time required for returning to the zero point is reduced, hysteresis that appears as an output can be reduced. For reference, FIG. 7 shows a characteristic III representing a change in sensor output in the normal state, a characteristic IV representing a change in sensor output in the case of expansion toward the positive side, and a characteristic V representing a change in sensor output in the case of expansion toward the negative side.

Figure 8:
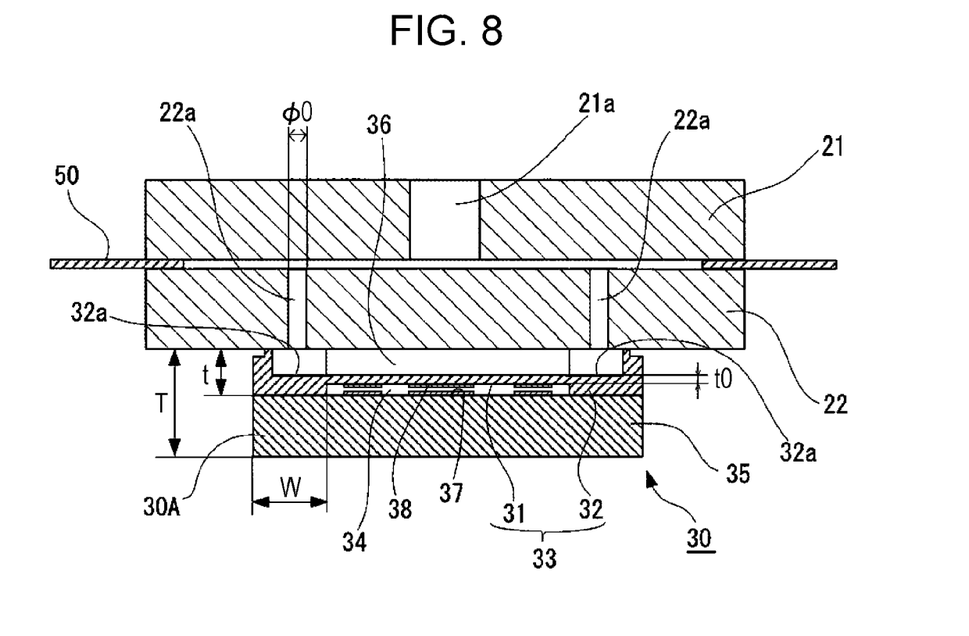
FIG. 8 illustrates the diaphragm support portion with deeper passages.

Although the second base plate 22 has four pressure introducing holes 22a in the embodiment described above, the number of the pressure introducing holes 22a does not necessarily need to be four, and the second base plate 22 may have only one pressure introducing hole 22a. As illustrated in FIG. 8, the diaphragm support portion 32 may have deeper passages 32a.

(Expansion of Embodiments)

Although the present disclosure has been described with reference to the embodiments, the present disclosure is not limited to the embodiments described above. Various changes which can be understood by those skilled in the art may be made to the configurations and details of the present disclosure, within the scope of the technical idea of the present disclosure.

What is claimed is:

1. A capacitive pressure sensor, comprising:
    a diaphragm displaced in response to pressure of a measured medium and a diaphragm support portion configured to support a periphery of the diaphragm;
    a sensor base joined to one side of the diaphragm support portion and configured to define a reference vacuum chamber together with the diaphragm;
    a base plate joined to the other side of the diaphragm support portion opposite the sensor base and configured to define a pressure introducing chamber together with the diaphragm;
    a fixed electrode formed on a surface of the sensor base adjacent to the reference vacuum chamber; and
    a movable electrode formed on a surface of the diaphragm adjacent to the reference vacuum chamber in such a manner as to face the fixed electrode,
    wherein the base plate has, at a position outside a lateral extent of the diaphragm, a pressure introducing hole having one end that directly faces the diaphragm support portion to introduce the measured medium into the pressure introducing chamber.

2. The capacitive pressure sensor according to claim 1, further comprising a plurality of additional pressure introducing holes formed at positions facing the diaphragm support portion.

3. The capacitive pressure sensor according to claim 2, wherein openings of the respective pressure introducing holes facing the diaphragm support portion are arranged on a circumference of a circle around the diaphragm at regular intervals in a circumferential direction.

4. The capacitive pressure sensor of claim 1, wherein the base plate includes four of the pressure introducing holes.

5. The capacitive pressure sensor of claim 1, wherein the diaphragm is circular and the pressure introducing hole is arranged outside the circular extent of the diaphragm.

6. The capacitive pressure sensor of claim 1, wherein the one end of the pressure introducing hole communicates with a passage of the diaphragm support portion to introduce the measured medium into the pressure introducing chamber.

* * * * *